United States Patent Office 3,623,272
Patented Nov. 30, 1971

3,623,272
MACHINE FOR CLOSED-CONTOUR GRINDING OF PARTS WITH VARIABLE CURVATURE
Mark Davydovich Flid, Smirnovskaya ulitsa 4a, kv. 65, and Leonid Grigorievich Dibner, Ulitsa Menzhinskogo 9, kv. 19, both of Moscow, U.S.S.R.
Filed Aug. 14, 1969, Ser. No. 850,043
Int. Cl. B24b 5/02
U.S. Cl. 51—105 R
8 Claims

ABSTRACT OF THE DISCLOSURE

A workpiece of variable curvature is ground on its surface by a grinding member and the workpiece is driven at variable angular speed to provide substantially constant linear speed of the workpiece at the point of contact with the grinding member. The workpiece is driven from a first helical gear which is in mesh with a second helical gear fixed on a spindle. The drive shaft which carries the first helical gear is driven in rotation and axially in order to provide the varying angular speed of the second helical gear to drive the workpiece in the manner previously indicated.

---

Figures 1, 2:
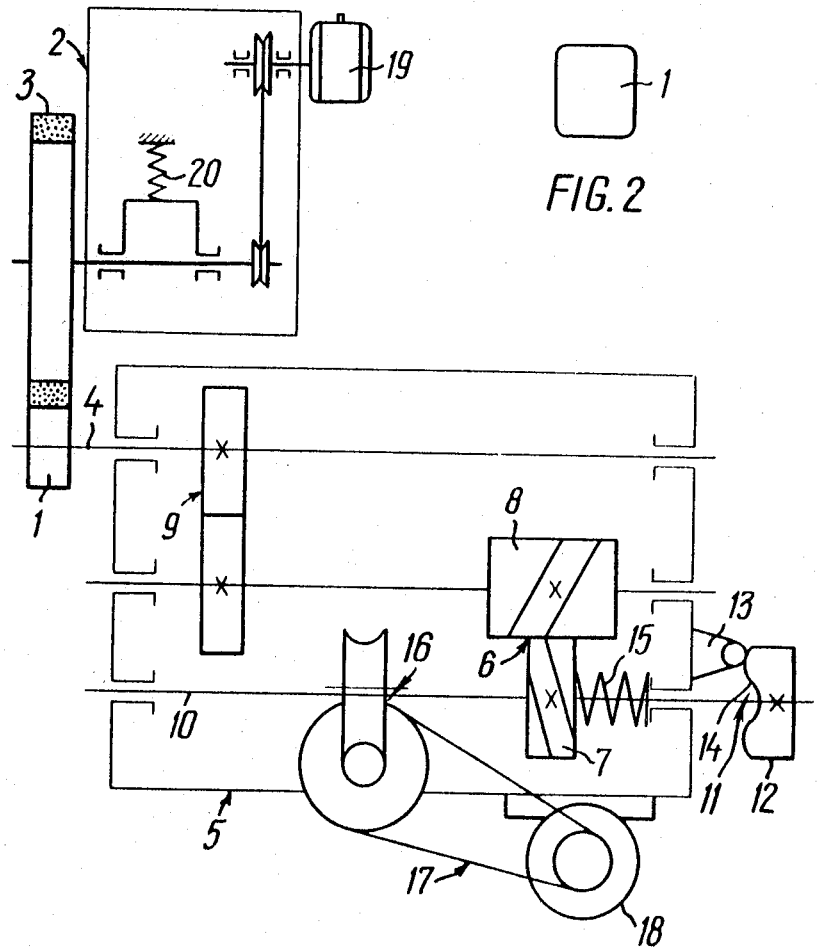

The present invention relates to grinding machines, and more specifically to machines for closed-contour grinding of parts with variable curvature, for example, for grinding the faces and apices of polyhedral plates.

Known in the art are machines for closed-contour grinding of parts with variable curvature (for instance "Harvill" machines, USA). In these machines the spindle with the workpiece is rotated at a uniform angular speed. In this case the linear speed of the workpiece at the point of contact with the grinding wheel changes depending on the curvature of the workpiece contour. The linear speed of the workpiece on straight sections of the contour is considerably higher than that on the curvilinear sections. Therefore, the grinding allowance is removed irregularly along the contour of the workpiece, quicker on the curvilinear sections and slower on the straight ones.

After grinding off the allowance from the curvilinear sections of the contour, the grinding wheel passing over these sections starts running idle which increases the losses of machining time and reduces the efficiency of the machine.

An object of the present invention is to provide a machine eliminating the aforesaid disadvantages.

The main object of the invention is to provide a machine for closed-contour grinding of parts with variable curvature which will speed up the process of grinding and promote its quality and accuracy.

This object is achieved by providing a machine for closed-contour grinding of parts with variable curvature secured on the spindle in which, according to the invention, the spindle drive incorporates an adding mechanism which ensures a variable-cycle angular speed of the spindle corresponding to the shape of the workpiece contour and is, essentially, a mechanical drive, whose driving member is connected kinematically with the programming mechanism while the driven member is connected with the spindle.

The mechanical drive may consist of two helical gears, the driving gear being installed with a provision for being moved axially by the programming mechanism.

The programming mechanism may comprise a face cam secured rigidly on the shaft of the adding mechanism driving gear, and a fixed stop contacting the working surface of the face cam.

The machine for closed-contour grinding of parts with variable curvature according to the invention ensures a constant linear speed of the workpiece at the point of contact with the grinding wheel which speeds up the process of grinding in comparison with the machines in current use, and promotes the quality and accuracy of grinding.

Now the invention will be described by way of example with reference to the accompanying drawings in which:

FIG. 1 is a diagrammatic illustration of a machine for closed-contour grinding of parts with variable curvature, according to the invention; and FIG. 2 is an end view of the workpiece.

The description that follows refers to a machine for grinding the faces and apices of polyhedral plates.

The machine for grinding the faces and apices of a polyhedral plate 1 comprises a drive 2 for a grinding wheel 3, and a spindle 4 for the plate 1 connected to a drive 5.

The drive 5 incorporates an adding mechanism 6 ensuring the cyclic angular speed of the spindle 4 to suit the contour of the plate 1 being ground.

The adding mechanism 6 is a mechanical drive consisting of two helical gears, namely a driving gear 7 and a driven gear 8. The driven gear 8 is connected to the spindle 4 via a gear drive 9.

The driving gear 7 is rigidly mounted on a shaft 10 which can be moved axially by a programming mechanism 11.

The programming mechanism 11 comprises a face cam 12 and a fixed stop 13 contacting the working surface 14 of cam 12. The profile of the working surface 14 of the face cam 12 corresponds to the contour of the plate 1 being machined.

A spring 15 ensures a constant contact between the working surface 14 of the face cam 12 and the fixed stop 13. The face cam 12 is rigidly secured on the shaft 10 which also carries the rigidly fastened driving helical gear 7 which is connected by a worm gear drive 16 and a belt drive 17 with a motor 18.

The machine operates as follows.

The plate 1 is fastened on the spindle 4. The motor 18 rotates the shaft 10 via the belt drive 17 and the worm gear drive 16, said shaft 10 being, in addition to rotation, move axially by the face cam 12. The driving gear 7 imparts an additional angular speed to the driven gear 8, this speed being either additive or subtractive depending on the axial direction of travel. As a result the spindle 4 connected with the driven gear 8 by the gear drive 9 rotates at a nonuniform angular speed, which changes so as to ensure a constant linear speed of the plate 1 at the point of its contact with the grinding wheel 3, the latter being rotated by the motor 19 via the drive 2. The grinding wheel 3 is pressed against the plate 1 by a spring 20.

What we claim is:

1. A machine for closed contour grinding of parts with variable curvature, said machine comprising a rotatable grinding member, means for driving the grinding member in rotation, a rotatable spindle for supporting a part with variable curvature for contact with the grinding member, and a drive means for rotating said spindle at a varying angular speed to provide substantially constant linear speed of the part at the point of contact with the grinding member, said drive means comprising a drive shaft which is rotatable and axially displaceable, a helical gear fixed on said drive shaft, a second helical gear in mesh with the first gear and coupled to said spindle to drive the same in rotation, and programming means coupled to said drive shaft to displace the same and the first helical gear therewith axially relative to said second helical gear to vary the angular speed of the latter and thereby of said part to provide the constant linear speed of the part at the point of contact with the grinding member.

2. A machine as claimed in claim 1 wherein said programming means comprises a face cam and a fixed stop, said face cam being secured rigidly on said drive shaft and urged aganist said face cam.

3. A machine as claimed in claim 2 comprising spring means acting on said drive shaft to urge the face cam against said fixed stop.

4. A machine for closed contour grinding of parts with variable curvature, said machine comprising a rotatable grinding member, means for driving the grinding member in rotation, a rotatable spindle for supporting a part with variable curvature for contact with the grinding member, and a drive means for rotating said spindle and including means for varying the angular speed of said spindle to provide substantially constant linear speed of the part at the point of contact with the grinding member.

5. A machine as claimed in claim 4 wherein said drive means comprises a drive shaft which is rotatable and axially displaceable, a first gear fixed on said drive shaft, a second gear in mesh with the first gear and coupled to said spindle to drive the same in rotation, said means for varying the angular speed of said spindle comprising programming means coupled to said drive shaft to displace the same and the first gear therewith axially relative to said second gear to vary the angular speed of the latter and thereby of said part to provide the constant linear speed of the part at the point of contact with the grinding member.

6. A machine as claimed in claim 5 wherein said gears are helical gears.

7. A machine as claimed in claim 5 wherein said programming means comprises a face cam and a fixed stop, said face cam being secured rigidly with said first gear and resiliently urged against said face cam.

8. A machine as claimed in claim 2 comprising spring means urging the face cam against said fixed stop.

References Cited

UNITED STATES PATENTS

| | | | |
|---|---|---|---|
| 927,130 | 7/1909 | Dorsey | 51—101 |
| 2,164,642 | 7/1939 | Drader | 51—101 X |
| 2,615,599 | 10/1952 | Griffing et al. | 51—101 X |

LESTER M. SWINGLE, Primary Examiner